United States Patent [19]

Yoshikawa et al.

[11] Patent Number: 5,037,865

[45] Date of Patent: Aug. 6, 1991

[54] RESIN DISPERSION TYPE AQUEOUS COATING COMPOSITION COMPRISING MICROPARTICLES OF 1 μM OR LESS

[75] Inventors: Motoyoshi Yoshikawa; Hideyoshi Noda; Sakuichi Konishi, all of Osaka, Japan

[73] Assignee: Nippon Paint Co., Ltd., Osaka, Japan

[21] Appl. No.: 339,822

[22] PCT Filed: May 27, 1988

[86] PCT No.: PCT/JP88/00523

§ 371 Date: Jan. 23, 1989

§ 102(e) Date: Jan. 23, 1989

[87] PCT Pub. No.: WO88/09357

PCT Pub. Date: Dec. 1, 1988

[30] Foreign Application Priority Data

May 27, 1987 [JP] Japan ................................. 62-130675

[51] Int. Cl.⁵ ............................ C08K 3/20; C08K 7/16
[52] U.S. Cl. .................................... 523/402; 523/223; 524/501
[58] Field of Search ................ 523/400, 402, 223, 501

[56] References Cited

U.S. PATENT DOCUMENTS 4,312,795  1/1982  Taguchi et al. .................. 260/18 R
4,528,318  7/1985  Konishi et al. ...................... 524/504

FOREIGN PATENT DOCUMENTS 56857  1/1981  Japan .
58-141249  8/1983  Japan .

Primary Examiner—Kriellion Morgan
Attorney, Agent, or Firm—Wenderoth, Lind & Ponack

[57] ABSTRACT

A resin dispersion type aqueous coating composition comprising a continuous phase of water medium and an aqueous resin and water insoluble resin microparticles uniformly dispersed, as a discontinuous phase, in said continuous phase, which is characterized in that said water insoluble resin is prepared by the reaction of a resin which is liquid at room temperatures and bears in its molecule functional groups capable of reacting with an epoxy or isocyanate group, and an epoxy compound or an isocyanate compound so as to give 10~100% reaction rate of the epoxy or isocyanate group contained in said compound. The present aqueous coating composition is excellent in its application characteristics and can give a coating with excellent gloss and smoothness.

2 Claims, No Drawings

RESIN DISPERSION TYPE AQUEOUS COATING COMPOSITION COMPRISING MICROPARTICLES OF 1 μM OR LESS

FIELD OF THE INVENTION

The present invention relates to an aqueous coating composition and more specifically, it concerns a resin dispersion type aqueous coating composition which is excellent in application characteristics, capable of resulting in a coating with far improved gloss and smoothness and is specifically useful as a top coat, an intermediate coat or an under coat for automobile bodies, electric appliances, household furniture and other general industrial uses, inter alia as a top coat for automobile bodies.

BACKGROUND OF THE INVENTION

An aqueous coating composition comprising water insoluble resin microparticles uniformly dispersed in a system comprising water and an aqueous resin is being watched with keen interest in respect to prevention of air-pollution and fire, economization in expensive, hazardous organic solvent, and capability of forming various combinations of resins so as to attain the characteristic properties of the respective member resins. However, such a system comprising, as film-forming components, an aqueous resin and water insoluble resin microparticles, though being excellent in application characteristics in respects of sagging and pinholes under low to intermediate temperature conditions, has a problem in smoothing in the film-forming step and moreover, it can not give any solution on the problem of coating failures under high temperature coating conditions.

To cope with the abovementioned problems, the present inventors have provided a coating composition comprising water insoluble resin microparticles uniformly dispersed in an aqueous resin, said water insoluble resin being prepared by the reaction of a carboxyl containing resin which is solid at room temperatures and a mono-epoxy compound or monoisocyanate compound, and a Japanese application was filed on it (now laid open as Kokai No. 141249-58).

According to that invention, since a highly viscous coating is obtained and the coating viscosity is advantageously lowered at the initial stage of baking, the thus formed coating is excellent in that sagging and pinhole defects are effectively obviated. However, since the flowability is not so high, there is room for further improvements in face roughness and gloss of the finished coating.

With the intention of further improvements in gloss and the like, the present inventors have also provided a coating composition comprising water insoluble resin microparticles containing a resin which is liquid at room temperatures, uniformly dispersed in an aqueous resin system, and a Japanese patent application was filed on that invention (now laid open as Kokai No. 23330-61). Though the invention is likewise useful, the disclosed composition still has the problem such that sagging is liable to occur due to an excessive lowering in viscosity of the coating at the initial stage of baking thereof.

Under the circumstances, a coating composition has been desired which will satisfy the conflicting sagging and pinhole requirements in application characteristics, as well as roughness and gloss requirements in finished coating appearance.

Should a coating composition be obtained in the form of aqueous paint, containing as essential components, water, aqueous resin and water insoluble resin, those resins being selectable from various species and the composition being able to give a coating with excellent face roughness and gloss and free from sagging and pinhole defects, it might be useful as a top coat, an intermediate coat or an under coat for automobile bodies, electric appliances, household furniture and other general industrial uses, and especially as a top coat for automobile bodies. It is, therefore, an object of this invention to provide such coating composition.

DISCLOSURE OF THE INVENTION

As the result of our extensive and energetic studies for the solution of the abovementioned problems. We have succeeded in attaining further improved face roughness and gloss properties, while obviating the deterioration of sagging property (striving for the prevention of both pinhole and sagging properties), by the selection of particular resin, as water insoluble resin microparticles, which is liquid at room temperatures, and modified in a defined way, thereby arriving at this invention.

Thus, the abovesaid object of the invention can be attained with the present resin dispersion type aqueous coating composition comprising a continuous phase of water medium and an aqueous resin and water insoluble resin microparticles uniformly dispersed as discontinuous phase in said continuous phase, said water insoluble resin being prepared by reacting a resin which is liquid at room temperatures and bears in its molecule functional groups capable of reacting with an epoxy or isocyanate group, and an epoxy compound or an isocyanate compound so as to give 10~100% reaction rate of the epoxy or isocyanate group contained in said compound.

BEST MODE OF EMBODIMENTS OF THE INVENTION

As the aqueous resin, any of the known resins customarily used in coating compositions may satisfactorily be used, which may be of anionic, cationic or amphoionic nature and may be of nonionic nature, too. Most preferable members are water soluble or water dispersible, alkyd-, polyester-, epoxy-, urethane-, aminoplast-, and maleinized oil- resins characterized by the later defined water tolerance and surface tension of an aqueous resin solution. That is, such resin should preferably have a surface tension, with respect to a 1% by weight water solution, of 51 dyne,/cm or less and a water tolerance, which is a measure of the dilution limit for a water-soluble resin and is expressed herein as the water dilution factor, with respect to the stage at which exactly 5 g of the aqueous varnish of the resin are in a 100 ml beaker, at the stage, following progressive dilution with deionized water, when No. 1 type can no longer be correctly read through the beaker, of 4 or more.

When the above-defined water tolerance of a resin is less than 4, there is a tendency that when added with water insoluble resin, the viscosity of the thus formed composition is increased and dispersion stability is ruined. When the abovesaid surface tension exceeds over the limit of 51 dyne/cm, there are the same tendencies of increase in viscosity and lowering of dispersion stability. In the actual use of such aqueous resin, when the resin is of anionic nature such as acrylic resin, alkyd resin and the like, it is advantageously neutralized with a basic compound and when the resin is of cationic nature, with an acidic compound, thereby making the resin water soluble or dispersible to obtain an aqueous solution or dispersion of said resin.

In the present invention, water insoluble resin is dispersed and contained as a discontinuous phase, in a continuous phase of such aqueous resin and water medium. At that time, as the water insoluble resin, there is used the reaction product of a resin which is liquid at room temperatures and bears in its molecule functional groups capable of reacting with an epoxy or isocyanate group, with an epoxy compound or an isocyanate compound so that the reaction rate of the epoxy or isocyanate group contained in said compound will be 10 to 100%.

The abovementioned resin which is liquid at room temperatures may preferably have an acid value of 100 or less and a number average molecular weight of 1,000~100,000. The species are optional such as, for example, acryl resin, alkyd resin, polyester resin, epoxy resin, aminoplast resin, acryl modified alkyd resin, acryl modified polyester resin and the like.

Examples of functional groups contained in the molecule of said liquid resin, which are reactive with an epoxy group, are carboxyl group, amino group, amide group, mercapto group, sulfonic acid group (or its salt), isocyanate group, lactone group and the like.

Examples of functional groups reactive with an isocyanate group are carboxyl group, hydroxyl group, amino group, amide group, sulfonic acid group (or its salt), epoxy group, imino group, mercapto group, oxime group and the like. As the epoxy compound to be reacted with the abovementioned liquid resin, mention is made of the following.

That is, as a monoepoxy compound, there are such members as, for example, olefine oxide, octylene oxide, butyl glycidyl ether, glycidyl methacrylate, p-t-butyl benzoic acid glycidyl ester, acryl glycidyl ether, glycidyl ester of t-carboxylic acid (e.g. Cardula E, trademark of Shell Chem.), styrene oxide, phenyl glycidyl ether, p-butyl phenol glycidyl ether, cresyl glycidyl ether, 3-pentadecyl phenyl glycidyl ether, cyclohexene vinyl monoxide, dipentene monoxide, α-pinene oxide, glycidol and the like. Examples of polyepoxy compounds are Epicoat 808 (Shell Petroleum Oil Co.), Epicoat 1001 (Shell Petroleum Oil Co.) and other similar bisphenol type compounds; Chissonox CX-221 (Chisso K.K., cyclic oxirane type compound), Epicron 705 (Dainippon Ink. K.K., glycidyl ether type compound), glycidyl ester type compound and other similar alicyclic compounds; DER 736 (Dow Comp., (poly) glycol ether type compound) and other similar acyclic aliphatic compounds; Epicron 200 (Dainippon Ink k.k.) and other similar polycarboxylic acid ester type compounds; Epicron 145 (Dainippon Ink K.K.) and other similar halogenide type compound; Aminoglycidyl type compound; resorein type compound.

Examples of isocyanate compounds to be reacted with the abovementioned liquid resin are monoisocyanate compounds; such as ethyl isocyanate, phenyl isocyanate and other alkyl or aromatic isocyanates, aromatic diisocyanates; such as tolylene diisocyanate, xylene diisocyanate, isophorone diisocyanate, and aliphatic diisocyanates; such as hexamethylene diisocyanate.

In reacting the abovementioned liquid resin with the epoxy compound or isocyanate compound, gelation is liable to occur when a polyepoxy or polyisocyanate compound and/or monoepoxy or monoisocyanate compound is used with the liquid resin whose acid equivalent is higher than the number average molecular weight thereof or when a polyepoxy or polyisocyanate compound is used with the liquid resin whose acid equivalent is lower than the number average molecular weight.

Therefore, preference is given to the use of monoepoxy or monoisocyanate compound.

As to the amounts of epoxy compound or isocyanate compound used in the reaction with the aforementioned liquid resin, it is preferred to select an amount in a range of 0.1~1.5 times the equivalent weight, and most preferably 0.1~1.4 times the equivalent weight. This is because if the amount of epoxy compound or isocyanate compound is less than 0.1 times the equivalent weight, there is no noticable modification effect, and if the said amount is more than 1.5 times the equivalent weight, an amount of unreacted product remain in the system, causing various undesired effects such as bad appearance, tackiness and the like at the film-forming stage. The liquid resin and the epoxy compound or isocyanate compound are reacted in the following way.

That is, the liquid resin is used in the form of resinous varnish originally obtained in the preparation thereof, or said liquid resin may be dissolved in a solvent to provide a solution thereof.

To this varnish or solution, there is added an optional catalyst (e.g. amines, organo phosphorus compounds, and the like) and then the abovementioned epoxy compound or isocyanate compound and the mixture is reacted at 100°~220° C., preferably 120°~170° C., for 15 minutes~5 hours, preferably 30 minutes~3 hours, and the formed resin is separated. Thus obtained resin is, when it is liquid at room temperatures, directly used as it is, or dissolved or dispersed in a solvent to get a resinous liquid. When it is solid at room temperatures, it is dissolved or dispersed in a solvent to obtain a resinous liquid, too. If desired, pigments, crosslinking agents, catalysts, dyestuffs, plasticizers and other coating additives may be dissolved or dispersed in said resinous liquid.

In this invention, thus prepared resinous liquid is then uniformly dispersed as fine liquid particles having an average diameter of 1μ or less, in a water-aqueous resin system. At that time, mixing may be advantageously carried out by using a conventional coating-use mixer.

The present coating composition thus obtained is excellent in storage stability, such as, for example, at 40° C. for 1 month or more. When applied on a substrate, there is no fear of troublesome sagging in contrast to a conventional coating composition, because, despite having a fairly low viscosity of the freshly made coating, the decrease in viscosity of the coating at the initial stage of baking is maintained at a comparatively low level. Furthermore, flowability of the coating composition is likewise excellent and if desired, it is possible to control the baking temperature so as to give enough time for flowing of the composition, thereby ensuring a coating with a very smooth surface. Thus, the control of coating viscosity is easily and advantageously done in the film-forming process. Therefore, it is possible to get a coating with excellent gloss and face roughness, by the adoption of the present coating composition, without the fear of undesired sagging and with good operational ease (maximum film thickness without sagging at elevated temperatures is increased to the extent of at least 10~3μ as compared with those of the conventional coating compositions). For these working effects, the present coating composition is specifically useful as a top coat for, inter alia, automobile bodies, electric appliances and the like.

The invention shall now be explained in the following Examples and Comparative Examples. Unless otherwise stated, all parts and % are by weight. As resinous liquids, the following were used.

SYNTHESIS OF RESINOUS LIQUIDS

Reference Example 1 (resinous liquid (1))

Into a flask, were placed 125 parts of a solution of acrylic acid having an acid value of 10.0, a hydroxyl value of 70 and a number average molecular weight of 2,500, in xylene (solid content 80%) and to this, were added 2.5 parts of phenyl glycidyl ether (Nippon Yushi K.K., Epiol P) and 0.4 part of dimethyl ethanol amine (catalyst) and the combined mixture was reacted, under stirring, at 130° C. for 3 hours to obtain a resinous liquid (1), the resin contained being liquid at room temperatures.

Reference Example 2 (resinous liquid (2))

Into a flask, were placed 125 parts of the same acrylic resin-xylene solution as used in Reference Example 1 and to this, were added 1.9 parts of hydroquinone diglycidyl ether and 0.4 part of dimethyl ethanol amine and the combined mixture was reacted under stirring at 130° C. for 2 hours to obtain a resinous liquid (2), the resin contained being at room temperatures.

Reference Example 3 (resinous liquid (3))

Into a flask, were placed 120 parts of a solution of polyester resin having an acid value of 55, a hydroxyl value of 0 and a number average molecular weight of 4,000, in Solvesso 100 (aromatic hydrocarbon solvent) (solid content 80%). To this, were added 7.15 parts of butyl glycidyl ether and 0.5 part of dimethyl benzyl amine and the combined mixture was reacted, under stirring, at 150° C. for 1 hour to obtain a resinous liquid (3), the resin contained being liquid at room temperatures.

Reference Example 4 (resinous liquid (4))

Into a flask, were placed 120 parts of the same polyester resin-Solvesso 100 solution as used in Reference Example 3. To this, were added 10.0 parts of phenyl isocyanate and 0.8 part of dibutyl tin laurate and the combined mixture was reacted, under stirring, at 150° C. for 4 hours to obtain a resinous liquid (4), the resin contained being liquid at room temperatures.

Reference Example 5 (resinous liquid (5))

The same acrylic resin-xylene solution as used in Reference Example 1 for the synthesis of resinous liquid (1) was used, as it was, as resinous liquid (5).

EXAMPLE 1

A coating composition was prepared by mixing the resinous liquid (1) of Reference Example 1 and aqueous resin varnish (4) shown in Table 1, in solid weight ratio of 37:100, at room temperature and stirring the same until a uniform composition was obtained.

EXAMPLES 2~8 AND COMPARATIVE EXAMPLE 1

Using the resinous liquids of the abovesaid Reference Examples and aqueous resin varnishes shown in Table 1, each in the weight ratio as given in Table 2, and following the procedures of Example 1, coating compositions were obtained.

Each coating composition obtained in Examples 1~8 and Comparative Example 1 was diluted with deionized water to a Ford Cup #4 viscosity of 30 seconds and the thus prepared diluted composition was applied by spraying onto a steel plate. After setting for 5 minutes, the coated plate was baked at 150° C. for 15 minutes to obtain a crosslinked film. Test results with the thus coated plate were shown in Table 2.

TABLE 1

| Varnish | resin species | *1 water tolerance (times) | *2 surface tension (dyne/cm) | acid value | hydroxyl value | neutralizing base | neutralization rate (%) | resin solid % (wt %) | Mn | oil length |
|---|---|---|---|---|---|---|---|---|---|---|
| [1] | alkyd resin | 10< | 42 | 55 | 36 | *3 | 80 | 30 | 1360 | 43 |
| [2] | maleinized lineseed oil | 10< | 46 | 62 | 61 | DMEA | 80 | 30 | 1300 | 55 |
| [3] | polyester resin | 5 | 48 | 10 | 100 | DMEA | 100 | 30 | 1500 | — |
| [4] | acryl resin | 10< | 40 | 69 | 60 | DMEA | 100 | 30 | 7000 | — |

*1 water tolerance: 5 g varnish are weighed in 100 ml beaker and gradually diluted with an increasing amount of deionized water. Water dilution limit wherein No. 1 type can no longer be correctly read through the beaker, is determined and expressed in terms of water tolerance
*2 surface tension: measured by using CB-VP type Surface tension meter manufactured by Kyowa Kagaku, with 1 wt % (solid) aqueous solution of the test varnish
*3 DMEA: dimethyl ethanol amine

TABLE 2

| | Coating compositions and test results | | | | | | | | Comp. Exam. |
|---|---|---|---|---|---|---|---|---|---|
| | Examples | | | | | | | | |
| | 1 | 2 | 3 | 4 | 5* | 6 | 7 | 8 | 1 |
| resinous liquid | (1) | (2) | (3) | (4) | (3) | (4) | (3) | (3) | (5) |
| aq. resin varnish | [4] | [4] | [4] | [4] | [1] | [1] | [2] | [3] | [4] |
| resin liquid/aq. resin varnish (solid weight ratio) | 37/100 | 37/100 | 37/100 | 37/100 | 37/100 | 37/100 | 37/100 | 37/100 | 37/100 |
| max. film thickness causing no sagging (μ) | 60 | 70 | 65 | 65 | 75 | 75 | 60 | 60 | 40 |
| max. film thickness | 50 | 50 | 50 | 50 | 50 | 50 | 60 | 50 | 50 |

TABLE 2-continued

| | Coating compositions and test results | | | | | | | | Comp. Exam. |
|---|---|---|---|---|---|---|---|---|---|
| | Examples | | | | | | | | |
| | 1 | 2 | 3 | 4 | 5 | 6 | 7 | 8 | 1 |
| causing no pinholes (μ) | | | | | | | | | |
| Blister resistance | | | | | | | | | |
| after 15 days | good | good | good | good | good | good | good | good | good |
| after 30 days* | good | good | good | good | good | good | good | good | good |

*storage duration (days) of the coating composition at 40° C.

What is claimed is:

1. A resin dispersion type aqueous coating composition for top coat use, comprising a continuous phase of water medium and an aqueous resin, and a discontinuous phase of water insoluble resin liquid microparticles having an average diameter of 1μ or less and being uniformly dispersed in said continuous phase, said water insoluble resin being prepared by reacting a resin which is liquid at room temperatures and bears in its molecule functional groups capable of reacting with an epoxy or isocyanate group, and an epoxy compound or an isocyanate compound so as to give a reaction rate of the epoxy or isocyanate group contained in said compound of 10 to 100%, thus prepared resin being uniformly dispersed in said continuous phase as liquid microparticles, when thus prepared resin is liquid, as it is, or when thus prepared resin is solid at room temperatures, being uniformly dispersed in said continuous phase after being dissolved or dispersed in solvent.

2. A composition according to claim 1, wherein the water insoluble resin contains an organic solvent.

* * * * *